US008616325B1

(12) United States Patent
Mesa

(10) Patent No.: US 8,616,325 B1
(45) Date of Patent: Dec. 31, 2013

(54) DRIVE SHAFT DAMPER ASSEMBLY

(71) Applicant: Gilberto Mesa, Miami, FL (US)

(72) Inventor: Gilberto Mesa, Miami, FL (US)

( * ) Notice: Subject to any disclaimer, the term of this patent is extended or adjusted under 35 U.S.C. 154(b) by 0 days.

(21) Appl. No.: 13/800,314

(22) Filed: Mar. 13, 2013

Related U.S. Application Data

(63) Continuation-in-part of application No. 12/970,325, filed on Dec. 16, 2010, now Pat. No. 8,439,150.

(51) Int. Cl.
*B60K 17/34* (2006.01)

(52) U.S. Cl.
USPC ............ 180/381; 180/359; 384/499; 384/502

(58) Field of Classification Search
USPC ........... 180/381, 359; 384/536, 581, 582, 535
See application file for complete search history.

(56) References Cited

U.S. PATENT DOCUMENTS

| | | | | | |
|---|---|---|---|---|---|
| 2,102,415 | A | * | 12/1937 | Herreshoff | 384/536 |
| 2,572,411 | A | * | 10/1951 | Watt | 384/536 |
| 2,893,790 | A | * | 7/1959 | Raes et al. | 384/536 |
| 3,140,901 | A | * | 7/1964 | Young | 384/536 |
| 3,306,679 | A | * | 2/1967 | Stokely | 384/536 |
| 3,309,154 | A | * | 3/1967 | Stokely | 384/536 |
| 3,936,104 | A | * | 2/1976 | Brinkman | 384/229 |
| 3,961,829 | A | * | 6/1976 | Bowen et al. | 384/536 |
| 4,067,626 | A | * | 1/1978 | McElwain | 384/582 |
| 4,422,780 | A | * | 12/1983 | Glaeser | 384/215 |
| 4,639,150 | A | * | 1/1987 | Habermann | 384/536 |
| 4,779,483 | A | * | 10/1988 | Andra et al. | 74/574.2 |
| 5,033,875 | A | * | 7/1991 | Moulinet | 384/536 |
| 5,039,230 | A | * | 8/1991 | Phillips et al. | 384/560 |
| 5,407,282 | A | * | 4/1995 | Bade et al. | 384/126 |
| 6,177,644 | B1 | * | 1/2001 | Wilkie et al. | 219/69.17 |
| 6,224,533 | B1 | * | 5/2001 | Bengtsson et al. | 494/82 |
| 6,863,443 | B2 | * | 3/2005 | Mahling | 384/536 |
| 7,103,975 | B2 | * | 9/2006 | Borsch et al. | 29/898.09 |
| 7,600,601 | B2 | * | 10/2009 | Lin et al. | 180/381 |
| 7,611,288 | B2 | * | 11/2009 | Lew | 384/536 |
| 7,637,666 | B2 | * | 12/2009 | Schmid | 384/536 |
| 8,083,413 | B2 | * | 12/2011 | Ertas | 384/117 |
| 2006/0078244 | A1 | * | 4/2006 | Lee et al. | 384/535 |
| 2007/0211980 | A1 | * | 9/2007 | Schmid | 384/536 |

FOREIGN PATENT DOCUMENTS

| | | | | |
|---|---|---|---|---|
| EP | 32370 A2 | * | 7/1981 | B60K 17/22 |
| EP | 412068 A1 | * | 2/1991 | B60K 17/24 |

* cited by examiner

*Primary Examiner* — Nicole Verley
(74) *Attorney, Agent, or Firm* — Malloy & Malloy, P.L

(57) ABSTRACT

A drive shaft damper assembly installed onto a drive shaft bearing secured to a drive shaft mounted to a vehicle. The drive shaft bearing assembly includes a bearing collar assembly securely attached to the drive shaft bearing. The drive shaft damper assembly also includes an inner damper assembly, interconnected to the bearing collar assembly, which defines an inner bushing interface, and an outer damper assembly defining an outer bushing interface. A bushing assembly is disposed in an operative engagement between the inner and outer damper assemblies, wherein each of a plurality of bushing members are individually interconnected between the inner bushing interface and the outer bushing interface via corresponding bushing fasteners, the bushing members being removable and replaceable to permit tuning of the operation of the drive shaft. A mounting mechanism is structured to securely attach the outer damper assembly to a portion of the vehicle.

19 Claims, 10 Drawing Sheets

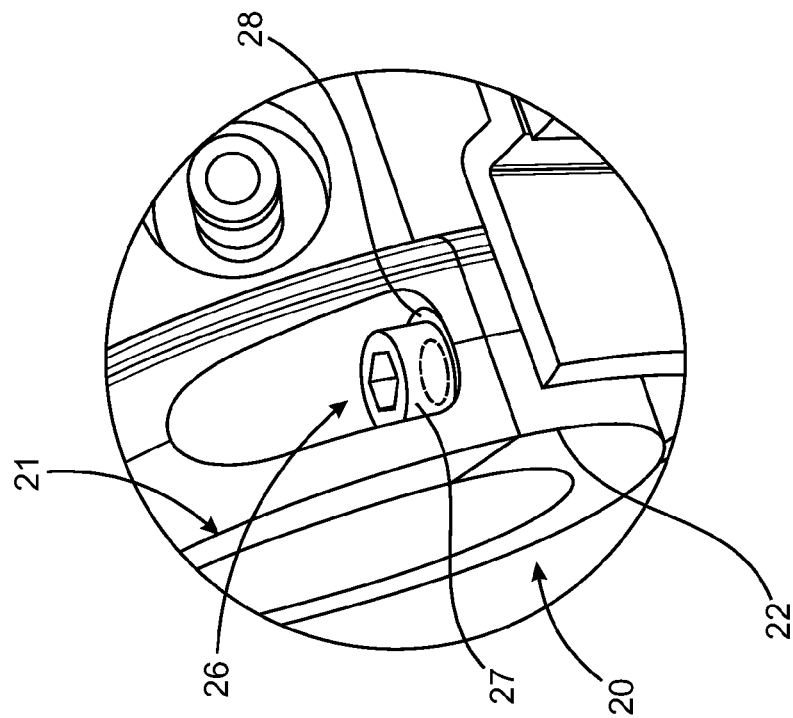
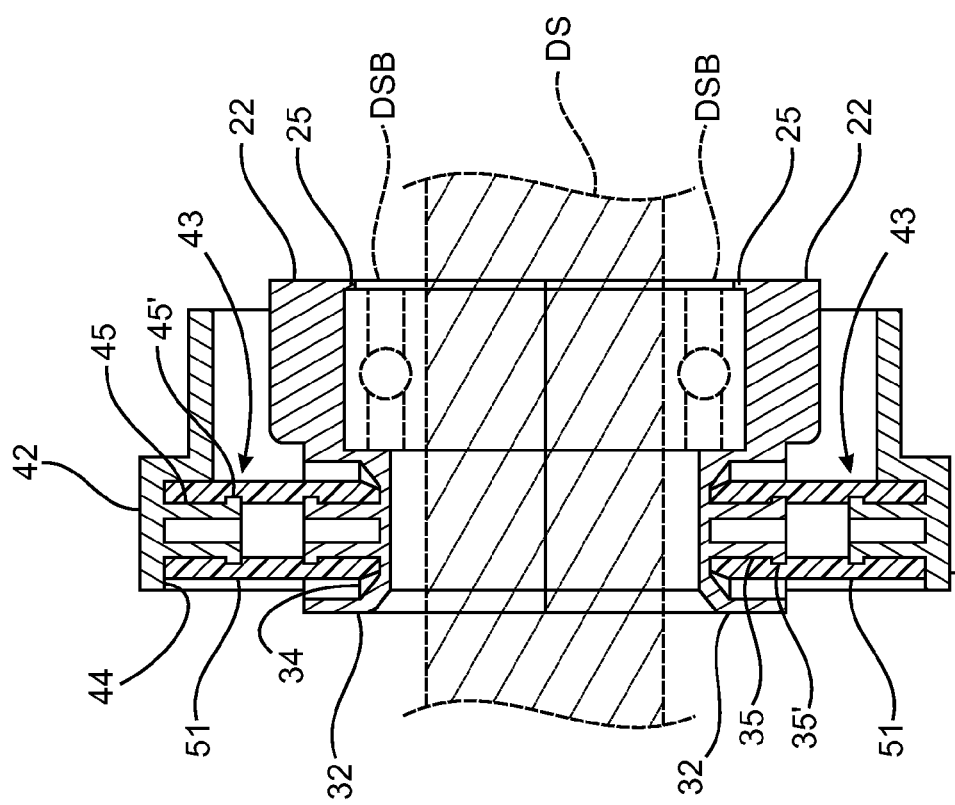
FIG. 4A
FIG. 4

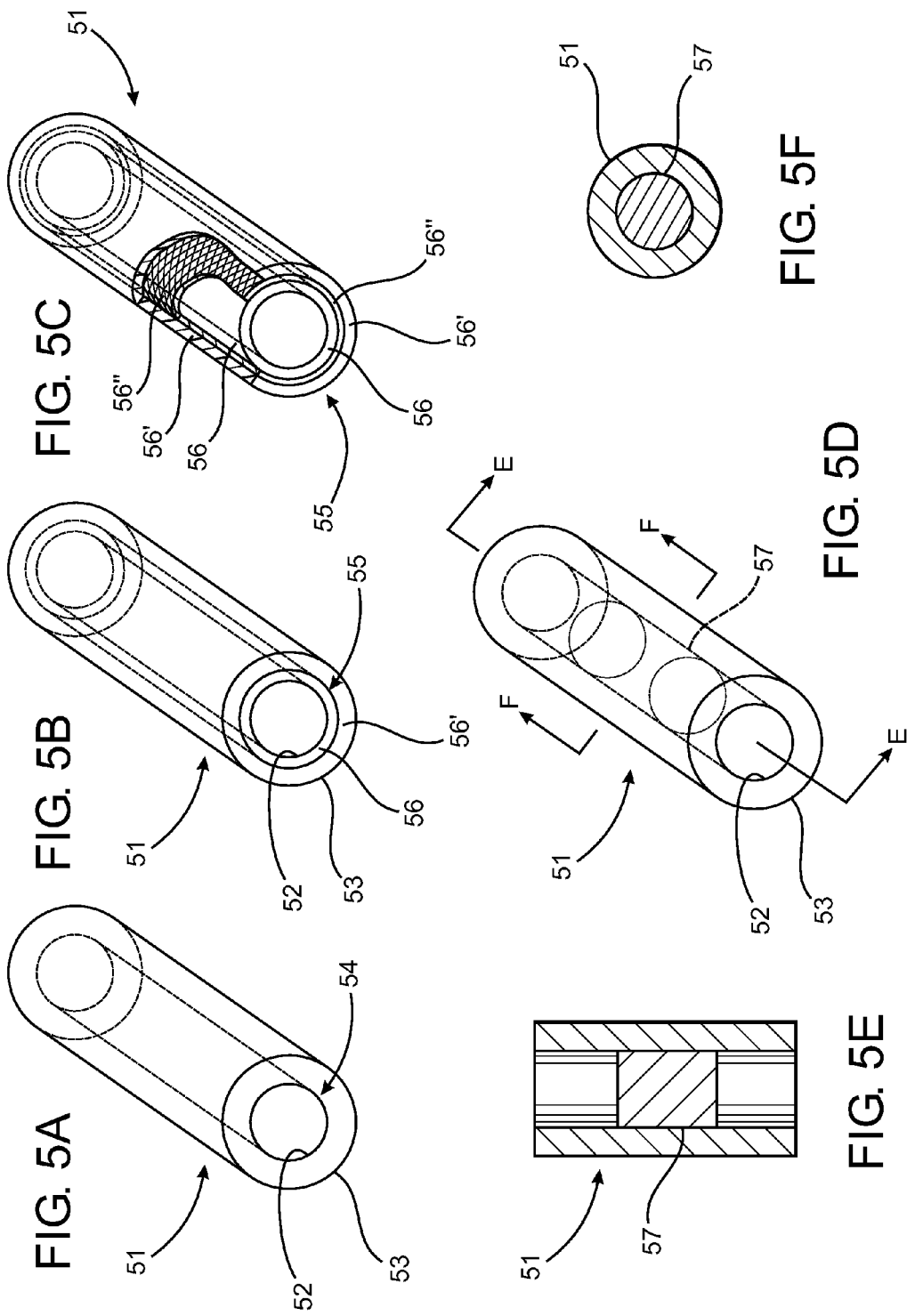

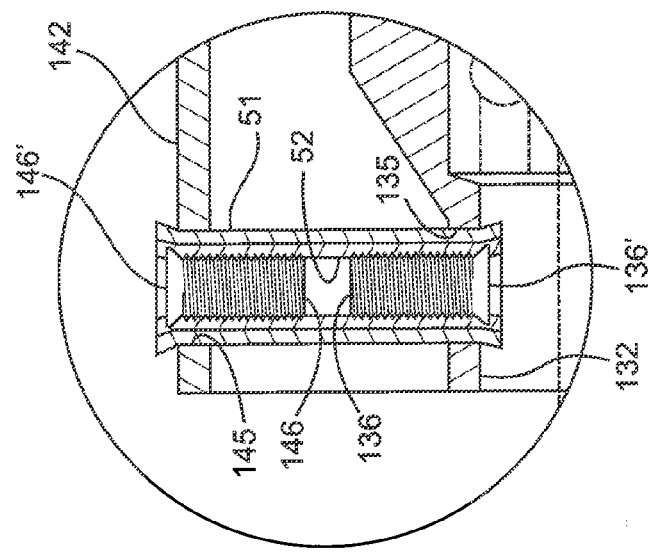
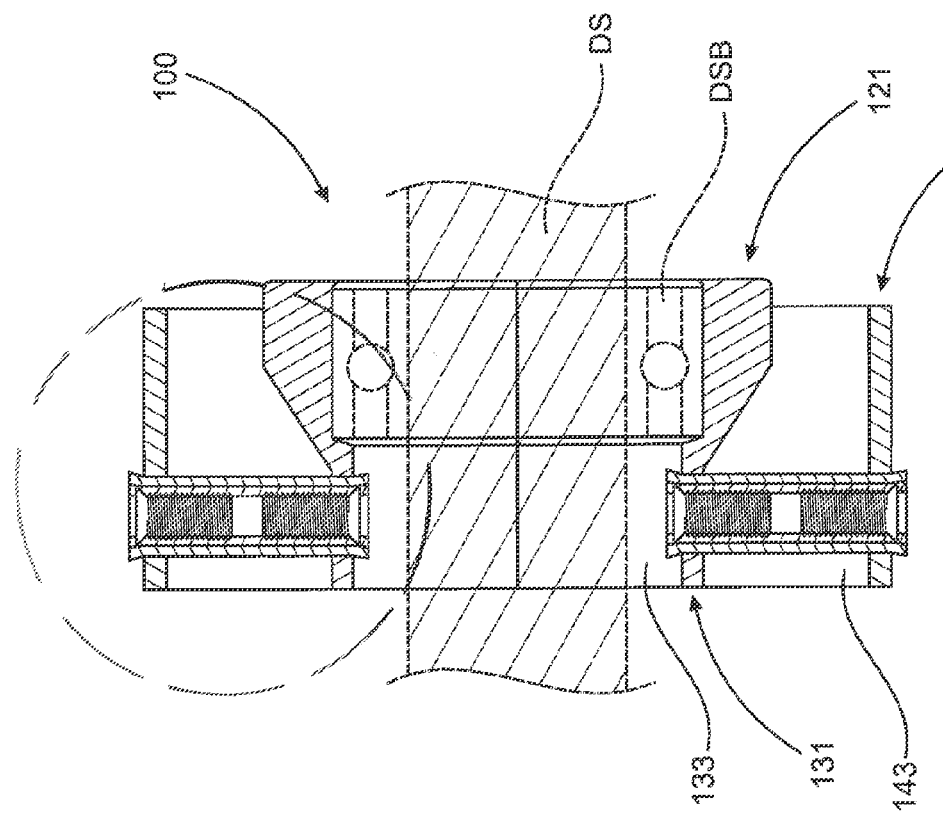
FIG. 8A
FIG. 8

DRIVE SHAFT DAMPER ASSEMBLY

BACKGROUND OF THE INVENTION

1. Field of the Invention

The present invention is directed to a drive shaft damper assembly structured to be installed on a drive shaft of a vehicle while the drive shaft remains installed on the vehicle. The present drive shaft damper assembly further includes a bushing assembly structured to permit a user to "tune" the drive shaft to compensate for inherent manufacturing irregularities which may cause a drive shaft to rotate offset from its central axis.

2. Description of the Related Art

Most automobiles manufactured today include a two piece drive shaft joined together using constant velocity ("C.V.") joints approximately midway along its length. More in particular, the C.V. joints are structured to compensate for minor misalignment between the separate pieces of the shaft as well as to compensate for the vibration to which the drive shaft is exposed during operation. In addition to the C.V. joints which join the separate portions of the drive shaft together, most automobiles are also equipped with a damper mechanism including a center support around at least a portion of one of the drive shaft members, wherein the center support includes an annular bushing which serves to cushion or dampen the vibrational forces exerted on the vehicle via rotational force generated of the drive shaft. As originally manufactured, the damper mechanism typically has an annular rubberized bushing or damper member which completely encircles and is fixedly attached to an outer bearing race, while a corresponding inner bearing race is securely affixed to a portion of the drive shaft itself, a plurality of ball bearings being operatively disposed therebetween. The outer periphery of the annular bushing is affixed to the inside of the center support which is secured to the underside of the vehicle itself. As will be appreciated, the continuous annular configuration of the bushing or damper member allows for both compression and tension forces to be exerted on the annular bushing. More in particular, the annular bushing can accommodate both tension and compression forces exerted thereon as a result of movement of the drive shaft from its central longitudinal axis of rotation. That is to say, when the drive shaft rotates offset from it central longitudinal axis of rotation, such as occurs due to inherent manufacturing irregularities and/or the set up of resonant frequencies, it will exert a compression force on one portion of an annular bushing, while a substantially equal and opposite tension force will be disposed approximately 180° degrees from the point of the compressive force on the annular bushing. As such, the opposing tension and compression forces act together to reposition the drive shaft and minimize the deviation of its rotation from its central longitudinal axis.

It has been observed that the annular bushing of the central support such as described above tends to fail after even moderate use in many vehicles, namely, in the range of about forty-thousand to sixty-thousand miles of operation. Of course, most vehicles manufactured today are designed to operate well over one hundred thousand miles, if not several hundred thousand miles. Therefore, it is common for the owners of many vehicles to have to replace the annular bushing several times over the useful life of the vehicle. Presently, in order to replace the annular bushing, the central support, annular bushing, and drive shaft bearing must all be removed from the drive shaft and replaced, thus requiring at least partial removal of the drive shaft from the vehicle itself, which requires significant time, labor, and expense. In many cases, the C.V. joints must be disassembled to remove the drive shaft, thereby requiring replacement of the same, adding further time and expense to the process. As will be appreciated, this is a very labor intensive procedure and, when the cost of the replacement parts are taken into account, the entire process can easily cost upwards of thousands of dollars per occurrence. In addition to this considerable expense, the owner of the vehicle is often without use of the vehicle for an extended period of time while the drive shaft is removed, replacement parts are ordered, and the drive shaft, annular bushing, and, in many cases, the C.V. joints, are reinstalled onto the vehicle.

In view of the time and expense required to resolve this problem, alternatives have been sought to replace the annular bushing of the central support without requiring disassembly and removal of the drive shaft or C.V. joints from the vehicle. Common to these alternatives is that at least a portion of an annular bushing is cut or split in order to allow placement over the outer bearing race of the drive shaft bearing mounted to the drive shaft, which remains installed on the vehicle. One such alternative provides an annular bushing which is split into two semicircular bushing portions which are positioned around the bearing assembly and are retained in place by an outer clamp. While this structure eliminates the need for removal of the drive shaft assembly from the vehicle, it introduces an inherent operational defect which negates at least one aspect of the intended purpose of the annular bushing itself. Specifically, as noted above, the original continuous annular bushing is structured such that substantially equal and opposing tension and compression forces are exerted on opposite portions of the continuous annular bushing by the drive shaft, because the annular bushing is fixedly attached to both the drive shaft bearing and the center support. As a result, these forces serve to act together to reposition the drive shaft into alignment with its central longitudinal axis of rotation.

As will be readily appreciated, however, when a continuous annular bushing is cut into two or more portions and positioned around the drive shaft bearing without being securely affixed to the drive shaft bearing as well as to the outer clamp, when the drive shaft exerts a compressive force on one portion of the split annular bushing, there is no longer a substantially equal and opposite tension force exerted on the other portion of the annular bushing opposite the point of compression. As such, a split annular bushing simply cannot serve the intended function of repositioning the drive shaft into alignment with its central longitudinal axis of rotation.

As such, it would be beneficial to provide an improved bushing assembly which may be mounted around a drive shaft while the drive shaft remains installed on a vehicle. More in particular it would be helpful for such an improved bushing assembly to be responsive to both compression and tension forces exerted by the drive shaft, such that the forces act together to reposition the drive shaft into alignment with its central longitudinal axis of rotation. Further, it would be beneficial for such an improved bushing assembly to allow for "tuning" of the drive shaft to minimize the set up of resonance frequencies which can result in unnecessary and potentially harmful or dangerous vibration of a vehicle during operation. A further benefit would be realized by providing an improved drive shaft damper assembly which permits replacement of individual bushing members without requiring removal of the entire drive shaft damper assembly from the drive shaft of the vehicle.

SUMMARY OF THE INVENTION

The present application is directed to a drive shaft damper assembly which is structured to be mounted to a drive shaft bearing which is secured to a drive shaft, while the drive shaft remains installed on a vehicle.

The drive shaft damper assembly comprises a bearing collar assembly having a collar, wherein the collar at least partially defines a bearing channel therein. In at least one embodiment, a bearing flange is disposed along at least a portion of a periphery of the bearing channel, serving to retain the collar securely about the drive shaft bearing.

More in particular, the bearing collar assembly comprises a plurality of collar members structured to permit the collar to be positioned around and securely attached to the drive shaft bearing while the drive shaft remains mounted to the vehicle. A securing mechanism is provided and is structured to securely yet removably attach the collar, or specifically, the collar members, around and to the drive shaft bearing.

The drive shaft damper assembly of the present invention further comprises an inner damper assembly having a plurality of inner sections. In at least one embodiment, each inner section of the inner damper assembly is interconnected to a corresponding one of the plurality of collar members of the bearing collar assembly. In at least one further embodiment, each inner section of the inner damper assembly is integrally attached to a corresponding one of the plurality of collar members of the bearing collar assembly. The plurality of inner sections of the inner damper assembly are further and cooperatively structured to define an inner bushing interface when disposed in an operative orientation relative to one another. In at least one embodiment, a plurality of inner bushing apertures are disposed in a spaced apart arrangement along the inner damper interface.

The present drive shaft damper assembly further comprises an outer damper assembly having a plurality of outer segments, wherein the plurality of outer segments are structured to substantially encircle the inner damper assembly when the outer segments are disposed in an operative configuration relative to one another. Similar to the plurality of inner sections of the inner damper assembly, the outer segments of the outer damper assembly are cooperatively structured so as to define an outer bushing interface, and further, in at least one embodiment, a plurality of outer bushing apertures are disposed in a spaced apart arrangement along the outer damper interface.

A bushing assembly is disposed in an operative engagement between the inner damper assembly and the outer damper assembly. In at least one embodiment, the bushing assembly comprises a plurality of bushing members individually and axially interconnected between the inner bushing interface and the outer bushing interface, and in one further embodiment, the plurality of bushing members are individually and axially interconnected between corresponding pairs of inner bushing apertures and outer bushing apertures via corresponding ones of a plurality of bushing fasteners.

A mounting mechanism is interconnected to at least a portion of the outer damper assembly and is structured to securely attach the outer damper assembly to a portion of the vehicle, thereby operatively interconnecting the drive shaft damper assembly between the drive shaft and the vehicle itself.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 4 is a cross-sectional side elevation illustrative of one embodiment of a drive shaft damper assembly in accordance with the present invention.

FIG. 4A is a partial perspective view of one embodiment of a securing mechanism of a collar assembly.

FIGS. 5A through 5F are illustrative of a few alternate embodiments of a bushing member in accordance with the present invention.

FIG. 8 is a cross-sectional side elevation illustrative of the embodiment of the drive shaft damper assembly of FIG. 7.

FIG. 8A is a detail sectional view of a bushing member mounted to the drive shaft damper assembly as shown in the inset in FIG. 8.

Similar reference numerals refer to similar parts throughout the several views of the drawings.

DETAILED DESCRIPTION OF THE PREFERRED EMBODIMENT

Figure 1A:
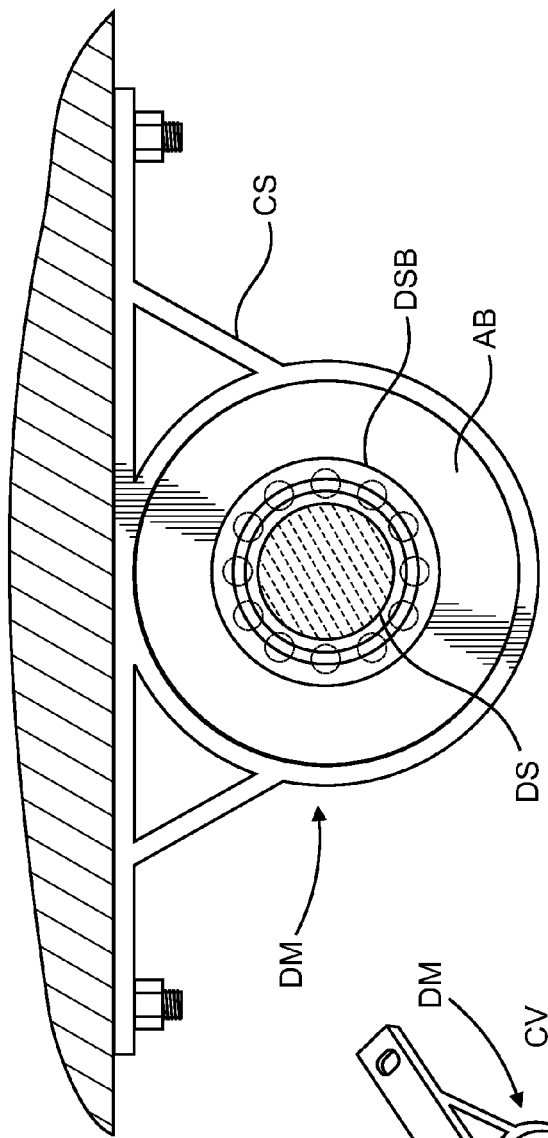
FIG. 1A is a cross-section of a drive shaft having the "prior art" damper mechanism of FIG. 1 mounted thereto.
Figure 1:
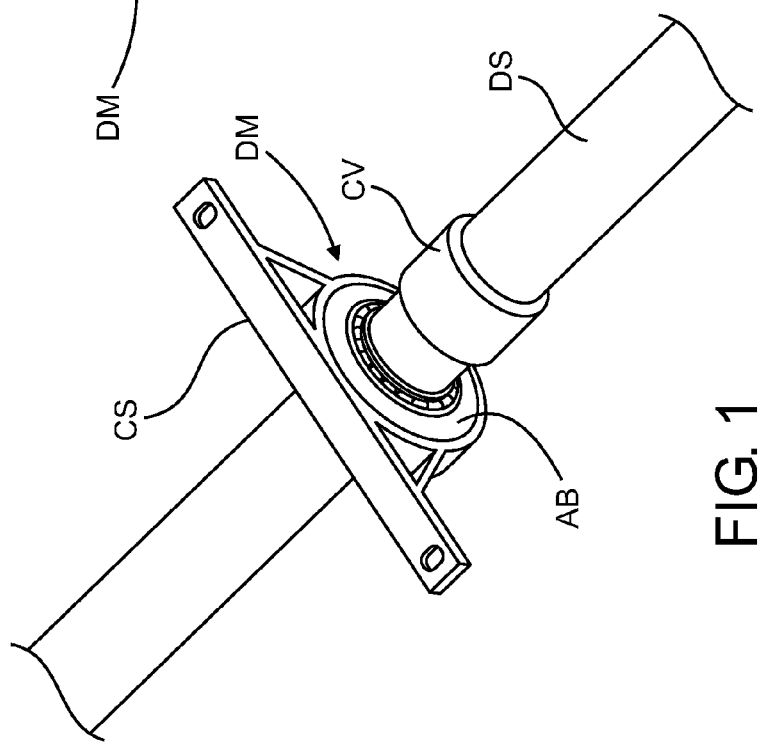
FIG. 1 is a partial perspective view of a "prior art" damper mechanism mounted to a drive shaft.

As noted above, the present invention comprises a drive shaft damper assembly generally as shown at 10 or 100 throughout the figures. In at least one embodiment, the present drive shaft damper assembly 10 is structured to replace a "prior art" damper mechanism (DM), such as is illustrated in FIGS. 1 and 1A. More in particular, and with reference to the "prior art" damper mechanism, a drive shaft bearing (DSB) is affixed to a drive shaft (DS), and as best illustrated in FIG. 1A, the "prior art" damper mechanism comprises an annular bushing (AB), which is affixed to the outer bearing race of the drive shaft bearing. A center support (CS) surrounds the annular bushing, which is also affixed thereto, and allows the "prior art" damper mechanism to be mounted to the underside of the vehicle, for example, as shown in FIG. 1A. FIG. 1 further illustrates constant velocity or C.V. joints (CV) which are structured and disposed to join together two separate portions of the drive shaft proximate the location of the "prior art" damper mechanism. As noted above, failure of the annular bushing is common in many modern vehicles after they have been driven anywhere in the range of about forty-thousand to sixty-thousand miles. As also noted above, and as is readily apparent from FIG. 1, replacement of the original "prior art" damper mechanism requires removal of at least a portion of the drive shaft from the vehicle, which often necessitates disassembly, and subsequent reassembly and/or replacement, of the C.V. joints. Further, in most cases, the entire drive shaft and the original "prior art" damper mechanism attached thereto must be removed from the vehicle in their entireties. As such, the owner is without use of his or her vehicle until this entire, time consuming and expensive process is completed.

Figure 1B:
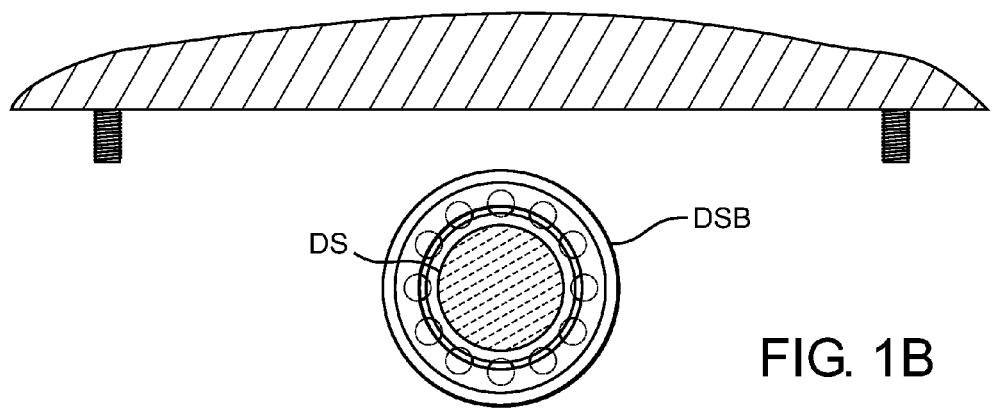
FIG. 1B is illustrative of a drive shaft bearing affixed to the drive shaft after removal of the annular bushing and center support of the "prior art" damper mechanism of FIGS. 1 and 1A.

The drive shaft damper assembly 10 of the present invention is structured to be mounted directly to the original drive shaft bearing while it remains affixed to the drive shaft. More in particular, the present drive shaft damper assembly 10 is structured to be mounted to the original drive shaft bearing after an original center support and annular bushing of a "prior art" damper mechanism have been removed, such as is illustrated in FIG. 1B.

Figure 2:
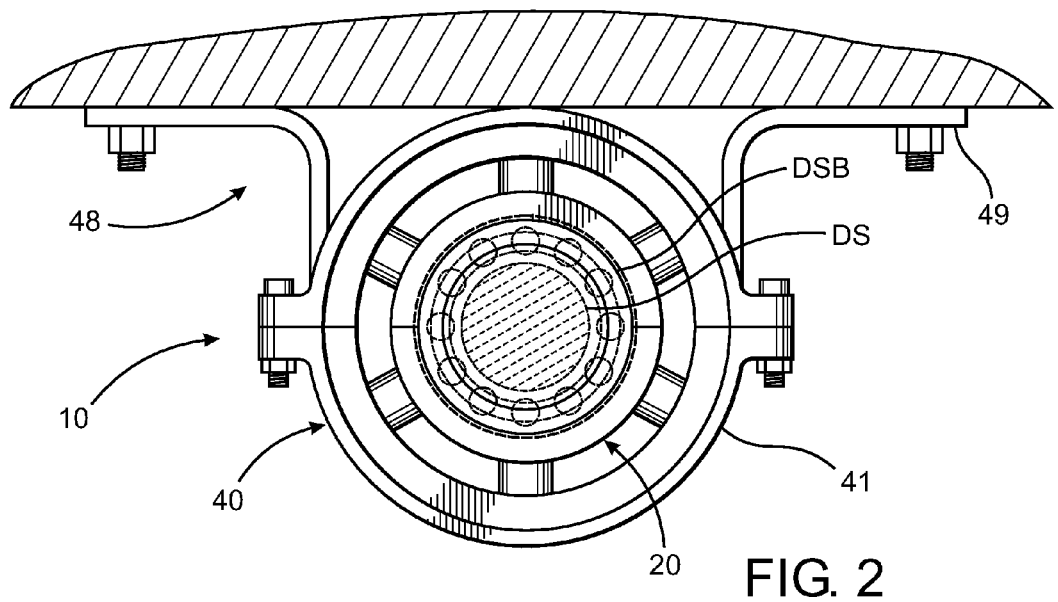
FIG. 2 is an elevation of one embodiment of a drive shaft damper assembly in accordance with the present invention installed onto a drive shaft bearing affixed to a drive shaft.

FIG. 2 is an elevation of one embodiment of the drive shaft damper assembly 10 in accordance with the present invention. Specifically, FIG. 2 illustrates a drive shaft damper assembly 10 mounted to an original drive shaft bearing (DSB) which remains secured to a drive shaft (DS), after removal of the original annular bushing and center support of the "prior art" damper mechanism, once again, as illustrated in FIG. 1B. Looking to FIG. 2, drive shaft damper assembly 10 comprises a bearing collar assembly 20 securely mounted to the drive shaft bearing (DSB). Looking further to FIG. 3A, which is a perspective view of the embodiment of the drive shaft damper assembly 10 as shown in FIG. 2, an inner damper assembly 30 is shown interconnected to the bearing collar assembly 20, in accordance with one embodiment of the present invention. An outer damper assembly 40 is disposed in a substantially encircling relation to inner damper assembly 30, once again, as illustrated in FIG. 3A, thereby defining a dampening zone 43 therebetween, as is discussed in greater detailed below. FIG. 3A further illustrates one embodiment of a bushing assembly 50 in accordance with the present invention, the bushing assembly 50 being operatively disposed and interconnected between inner damper assembly 30 and outer damper assembly 40.

Figure 3:
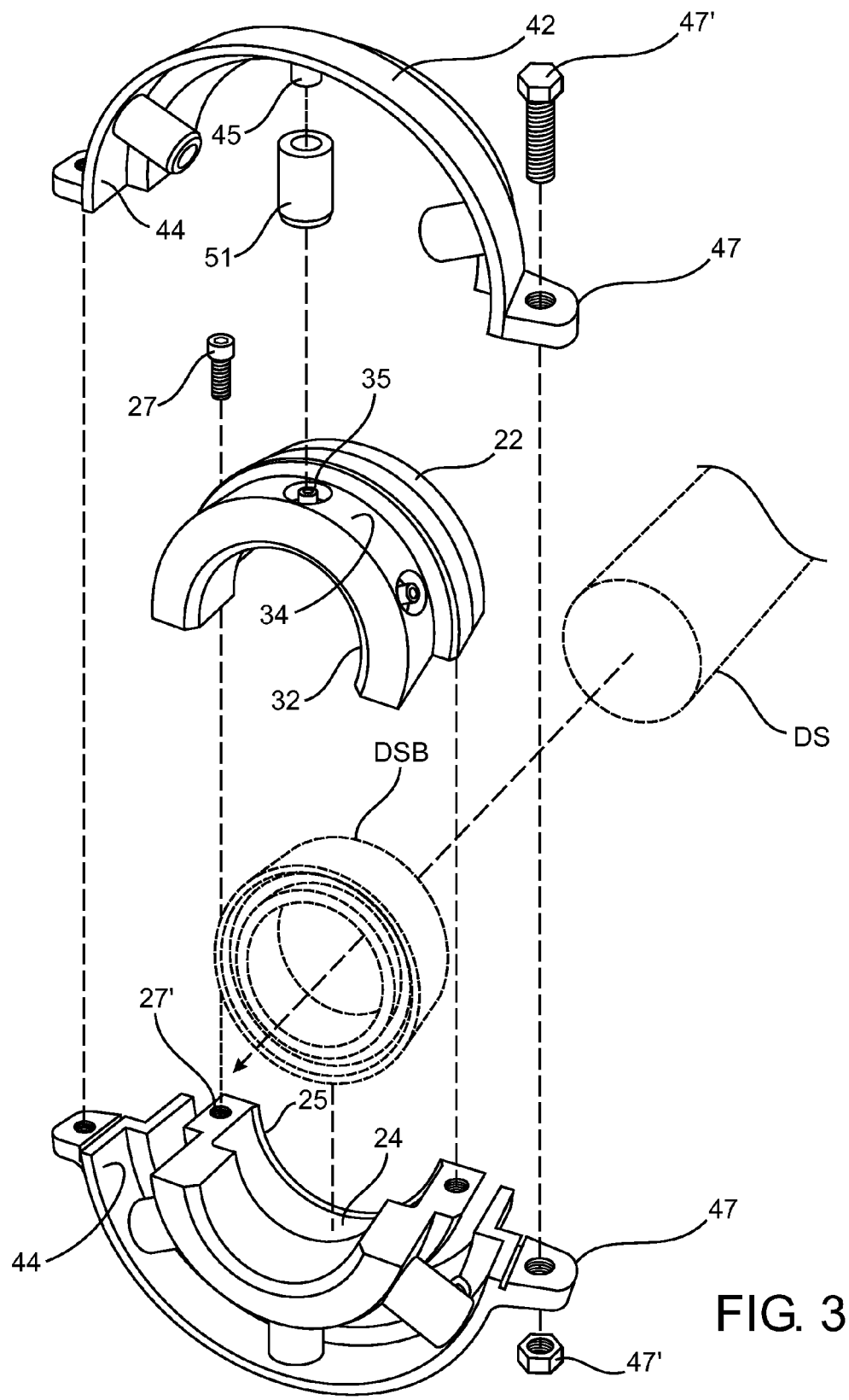
FIG. 3 is an exploded view of one embodiment of a drive shaft damper assembly in accordance with the present invention.
Figure 3A:
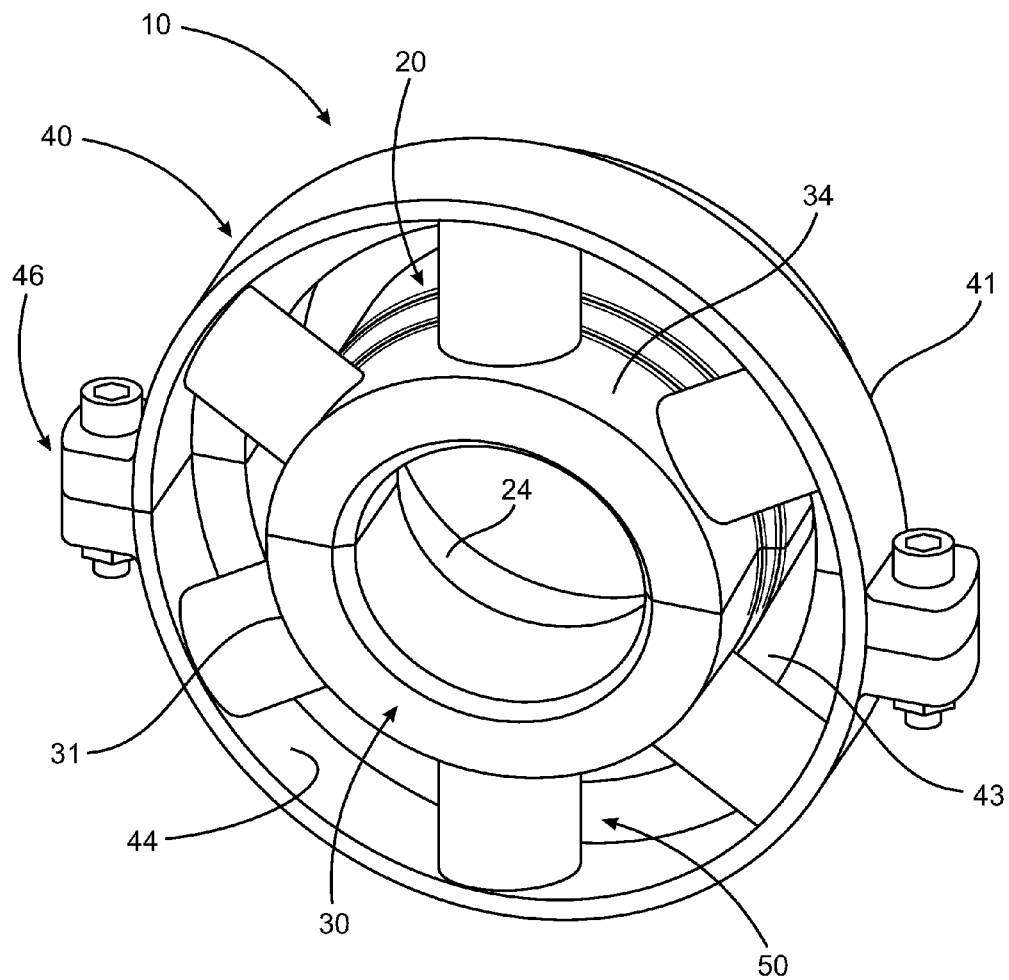
FIG. 3A is a perspective view of the drive shaft damper assembly of FIG. 3 in an assembled configuration.

An exploded view of one embodiment of a drive shaft damper assembly 10 in accordance with the present invention is presented in FIG. 3. As before, drive shaft damper assembly 10 comprises a bearing collar assembly 20 comprising a collar 21 which is cooperatively structured to be securely mounted to drive shaft bearing (DSB). Collar 21 comprises a plurality of separable collar members 22, each of said collar members 22 comprising a portion of a bearing channel 24 structured to be securely mounted to the outer race of the drive shaft bearing (DSB). In at least one embodiment, collar members 22 comprise a bearing flange 25, such as is illustrated in FIG. 3, wherein the bearing flange 25 is structured to secure collar 21 to the outer race of drive shaft bearing (DSB). As shown in the embodiment of FIG. 3, the bearing flange 25 is disposed substantially and continuously along the periphery of bearing channel 24. However, it is understood to be within the scope and intent of the present invention for the bearing flange 25 to comprise one or more non-continuous portions intermittently spaced apart along the periphery of the bearing channel 24. Further, as shown in the figures, the bearing collar assembly 20 comprises two semi-circular collar members 22, of course, it is also within the scope and intent of the present invention for bearing collar assembly 20 to comprise a plurality of collar members 22 cooperatively structured to substantially encircle and be securely attached to the outer race of a drive shaft bearing (DSB).

To facilitate securely attaching collar 21 to drive shaft bearing (DSB), in at least one embodiment, bearing collar assembly 20 comprises a securing mechanism 26. As illustrated best in FIG. 4A, in at least one embodiment, securing mechanism 26 comprises at least one fastener 27 structured to be received in a fastener interface 28 disposed on one of collar members 22. Of course, it will be appreciated that one or more alternative securing mechanism 26 may be employed in accordance with the present invention, for example, a circular clamp may be affixed around the outer periphery of collar 21 so as to securely maintain collar members 22 in their operative position securely attached to drive shaft bearing (DSB).

FIGS. 3, 3A and 4 are further illustrative of an inner damper assembly 30. More in particular, inner damper assembly 30 comprises a plurality of inner sections 32 which are cooperatively structured to form inner damper 31, as shown best in FIG. 3A. In at least one embodiment, each inner section 32 of inner damper 31 is interconnected to a corresponding collar member 22 of collar 21. Further, in at least one further embodiment, such as is presented in the illustrative embodiment FIG. 3, each inner section 32 is integrally attached to a corresponding collar member 22. Similar to collar 21, inner damper 31 comprises a substantially annular configuration forming a drive shaft aperture 33 therethrough, as illustrated best in FIG. 6A. More in particular, the drive shaft aperture 33 is structured to permit at least portion of a drive shaft (DS) to pass through the inner damper 31 and allow its operation, i.e., rotation, while disposed therethrough. FIG. 3 further illustrates that each inner section 32 defines at least a portion of an inner bushing interface 34 on an outer surface thereof. Further, each inner section 32 comprises at least one inner bushing mount 35 securely affixed thereto. In at least one embodiment, each inner section 32 of inner damper 31 comprises a plurality of inner bushing mounts 35 along its corresponding portion of inner bushing interface 34. In yet one further embodiment, each inner bushing mount 35 comprises at least one flange 35' (see FIG. 4) structured to retain a bushing member 51 securely yet removably attached thereto. Of course, it is within the scope and intent of the present invention for the bushing members 51 to be securely attached to an inner bushing mount 35 via other fastening mechanisms, such as a clamp, friction fit, heat weld, adhesive, etc.

The plurality of inner sections 32 of inner damper 31 may be retained and positioned relative to one another via a securing mechanism such as described above with respect to collar 21. Alternatively, in an embodiment wherein inner damper 31 and collar 21 are integrally attached, such as is presented in the illustrative embodiments of the present invention presented herein, securing mechanism 26 of bearing collar assembly 20 serves to securely retain the plurality of inner sections 32 of inner damper 31 in an operative position relative to a drive shaft (DS).

As shown in the figures, the drive shaft damper assembly 10 in accordance with the present invention further comprises an outer damper assembly 40. Outer damper assembly 40 comprises an outer damper 41 having a plurality of outer segments 42. More in particular, and as noted above, the outer damper 41 is structured to substantially encircle inner damper 31 of inner damper assembly 30, thereby forming a dampening zone 43 therebetween. Outer segments 42 of outer damper 41 comprise at least a portion of an outer damper interface 44. Further, at least one outer bushing mount 45 is securely affixed to the portion of the outer bushing interface 44 of each outer segment 42. Similar to inner bushing mounts 35 of inner damper 31, in at least one embodiment, each outer bushing mount 45 comprises a flange 45' which is structured to securely yet removably retain a portion of a bushing member 51 thereon. As in the case of inner bushing mounts 35, it is within the scope and intent of the present invention for bushing members 51 to be securely attached to an outer bushing mount 45 via other fastening mechanisms, such as clamps, friction fit, heat weld, adhesives, etc.

In at least one embodiment, a retainer mechanism 46 is employed to secure outer segments 42 of outer damper 41 to one another and to retain them in an operative orientation. In the illustrative embodiment of FIGS. 3 and 3A, retainer mechanism 46 comprises a pair of cooperatively structured tabs 47 on either end of outer segments 42, each tab 47 having an aperture therethrough. Fastener 47', such as a nut and bolt as illustrated in the figures, may be employed in order to securely and removably attach outer segments 42 of outer damper 41 to one another. Of course, it will be appreciated it is well within the scope of intent of the present invention for any of a plurality of other mechanical fasteners to be employed by retainer mechanism 46 in order to maintain the plurality of outer segments 42 of outer damper 41 secured to one another in an operative orientation. As just one example, retainer mechanism may comprise a fastener and fastener interface similar to the securing mechanism 26 of collar 21, as disclosed above.

The outer damper assembly 40 further comprises a mounting mechanism 48 which is structured to secure outer damper assembly 40 to a portion of the vehicle in an operative configuration. In at least one embodiment, mounting mechanism 48 comprises at least one bracket 49. As illustrated in FIG. 2, mounting mechanism 48 comprises a plurality of brackets 49 extending from either side of one portion of outer segment 42 of outer damper 41.

As noted above, the drive shaft damper assembly 10 of the present invention further comprises a bushing assembly 50. Looking once again to FIG. 3, and also to FIG. 6A, bushing assembly 50 comprises a plurality of bushing members 51, each having a substantially cylindrical configuration, wherein each bushing member 51 comprises an inner periphery 52 and an outer periphery 53. More in particular, inner periphery 52 is structured and dimensioned such that bushing member 51 may be removably secured at one end to an inner bushing mount 35 of an inner section 32 of inner damper 31, and at an opposite end to a corresponding outer bushing mount 45 of a corresponding outer segment 42 of outer damper 41, such as illustrated best in FIG. 3.

Figure 7:
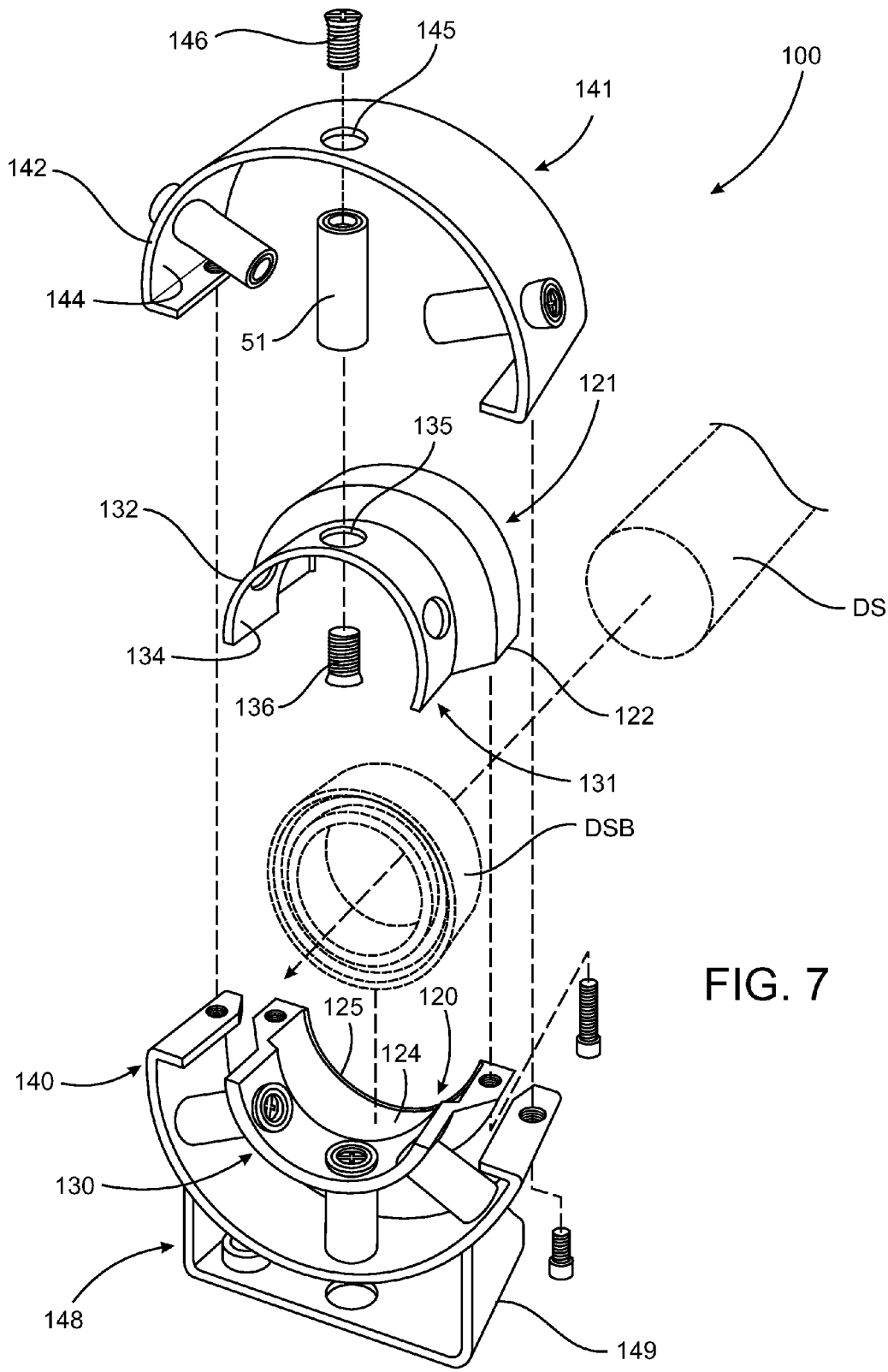
FIG. 7 is an exploded view of one other embodiment of a drive shaft damper assembly in accordance with the present invention.

FIG. 7 is an exploded view illustrative of one alternative embodiment of a drive shaft bearing assembly 100 in accordance with the present invention. As before, the drive shaft damper assembly 100 comprises a bearing collar assembly 120 having a collar 121 cooperatively structured to be securely mounted to drive shaft bearing (DSB). The collar 121 comprises a plurality of separable collar members 122, each of the collar members 122 comprising a portion of a bearing channel 124 structured to be securely mounted onto the outer race of the drive shaft bearing (DSB). In at least one embodiment, collar members 122 comprise a bearing flange 125, such as is illustrated in FIG. 7, wherein the bearing flange 125 is structured to secure each of the collar members 122 to the outer race of drive shaft bearing (DSB). As shown in the embodiment of FIG. 7, the bearing flange 125 is disposed substantially and continuously along the periphery of bearing channel 124. However, it is once again understood to be within the scope and intent of the present invention for the bearing flange 125 to comprise one or more non-continuous portions intermittently spaced apart along the periphery of the bearing channel 124. Further, as shown in the illustrative embodiment of FIG. 7, the bearing collar assembly 120 comprises two semi-circular collar members 122. Of course, it is also within the scope and intent of the present invention for bearing collar assembly 120 to comprise a plurality of collar members 122 cooperatively structured to substantially encircle and be securely mounted to the outer race of a drive shaft bearing (DSB).

The present drive shaft damper assembly 100 further comprises an inner damper assembly 130, as shown in the illustrative embodiment of FIG. 7. More in particular, inner damper assembly 130 comprises a plurality of inner sections 132 which are cooperatively structured to form an inner damper 131. In at least one embodiment, each inner section 132 of the inner damper 131 is interconnected to a corresponding collar member 122 of collar 121. In at least one further embodiment, such as is shown in the illustrative embodiment of FIG. 7, each inner section 132 is integrally attached to a corresponding collar member 122. Similar to collar 121, inner damper 131 comprises a substantially annular configuration, thereby forming a drive shaft aperture 133 therethrough, as illustrated best in FIG. 8. More in particular, the drive shaft aperture 133 is structured to permit at least portion of a drive shaft (DS) to pass through the inner damper 131 and allow operation, i.e., rotation, while disposed therethrough.

FIG. 7 also shows each inner section 132 defining at least a portion of an inner bushing interface 134. Further, each inner section 132 comprises at least one inner aperture 135, wherein the inner aperture 135 is dimensioned to permit passage of at least a portion of at least one bushing member 51 therethrough, while said bushing member 51 is in an unstressed state. A bushing fastener 136 is provided to secure a portion of the bushing member 51 in the inner aperture 135. In at least one embodiment, each inner section 132 of inner damper 131 comprises a plurality of inner apertures 135 disposed along and through its corresponding portion of inner bushing interface 134, as illustrated best in FIG. 7, and a plurality of bushing members 51 are secured to each inner section 132 via a corresponding plurality of bushing fasteners 136.

The plurality of inner sections 132 of inner damper 131 may be retained and positioned relative to one another via a securing mechanism such as described above. Alternatively, in an embodiment wherein inner damper 131 and collar 121 are integrally attached, such as shown in the illustrative embodiment of FIG. 7, the securing mechanism of the bearing collar assembly 120 serves to securely retain the plurality of inner sections 132 of inner damper 131 in an operative position relative to a drive shaft (DS).

As further illustrated in the embodiment of FIG. 7, the drive shaft damper assembly 100 in accordance with the present invention further comprises an outer damper assembly 140. Outer damper assembly 140 comprises an outer damper 141 having a plurality of outer segments 142. More in particular, and as before, the outer damper 141 is structured to substantially encircle inner damper 131 of inner damper assembly 130, thereby forming a dampening zone 143 therebetween, as best shown in FIG. 8. In at least one embodiment, each outer segment 142 of outer damper 141 comprises at least a portion of an outer damper interface 144.

Further, each outer bushing interface 144 of each outer segment 142 comprises at least one outer aperture 145, as also illustrated in the embodiment of FIG. 7. Similar to inner apertures 135 of inner damper 131, in at least one embodiment, each outer aperture 145 is dimensioned to permit passage of at least a portion of at least one bushing member 51 therethrough, while said bushing member 51 is in an unstressed state. Also similar to inner aperture 135, a bushing fastener 146 is provided to secure a portion of the bushing member 51 in the outer aperture 136. In at least one embodiment, each outer segment 142 of outer damper 141 comprises a plurality of outer apertures 145 disposed along and through its corresponding portion of outer bushing interface 144, as illustrated best in FIG. 7, and a plurality of bushing members 51 are secured to each outer segment 142 via a corresponding plurality of bushing fasteners 146.

More in particular, and as shown best in FIG. 8A, each bushing fastener 136, 146 comprises a plurality of threads to securely engage a different portion of the inner periphery 52 of bushing member 51. Further, each bushing fastener 136, 146 comprises an enlarged fastener head 136', 146', respectively, having a diameter greater than the diameter of the inner periphery 52 of bushing member 51. As such, when bushing fasteners 135, 145 are threaded into and through corresponding ends of bushing member 51, the ends of the bushing member 51 are forced outwardly such that they cannot pass through either inner or outer aperture 135, 145, as shown in the figures. Further, and once again as shown best in FIG. 8A, when oppositely disposed ends of a bushing member 51 are positioned through different ones of an inner aperture 135 and an outer aperture 145, and a corresponding bushing fastener 136, 146 is threaded into and through each corresponding open end of the bushing member 51, the bushing member 51 is securely mounted between inner section 132 of inner damper 131 and outer segment 142 of outer damper 141, until such time as bushing fastener 136 and/or 146 is removed.

Figure 9A:
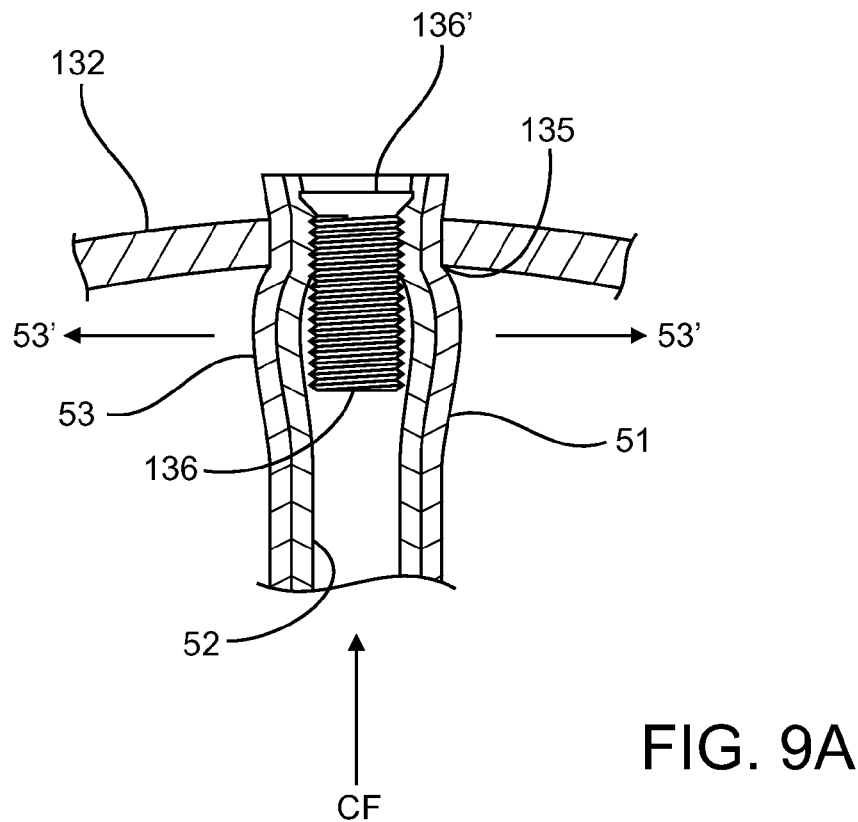
FIG. 9A is illustrative of a bushing member mounted to a portion of a drive shaft damper assembly wherein the bushing member is in compression relative to the portion of the drive shaft damper assembly.
Figure 9B:
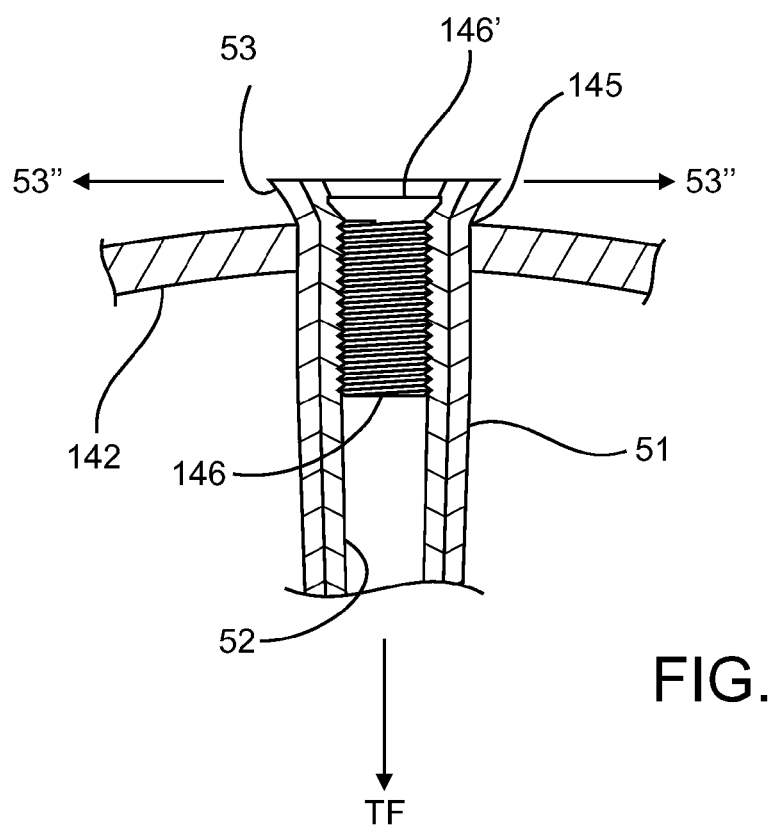
FIG. 9B is illustrative of a bushing member mounted to a portion of a drive shaft damper assembly wherein the bushing member is in tension relative to the portion of the drive shaft damper assembly.

More in particular, bushing fasteners 136, 146 secure the bushing member 51 in position regardless of whether compression or tensioning forces are applied thereto, as shown in FIGS. 9A and 9B, respectively. Specifically, and with reference to FIG. 9A, when a compressive force (CF) is applied to one end of a bushing member 51 which is secured through an inner aperture 135 via a bushing fastener 136, the compressive force will cause the outer periphery 53 of the bushing member 51 to expand outwardly, as indicated by arrows 53', at inner aperture 135, and more in particular, at the interface of inner aperture 135 through inner section 132. As such, bushing member 51 cannot be pushed out through inner aperture 135 in the direction of the compressive force, once again, as illustrated best in FIG. 9A. As will be appreciated, the application of greater compressive force will simply result in further outward expansion of the outer periphery 53 of the bushing member 51 in the direction of arrows 53', once again, preventing further passage of bushing member 51 through inner aperture 135. As will also be appreciated, a similar result will be observed upon application of a compressive force (CF) on a bushing member 51 secured through an outer aperture 145 via bushing fastener 146.

Similarly, and turning to FIG. 9B, when a tensioning force (TF) is applied to one end of a bushing member 51 which is secured through an outer aperture 145 via a bushing fastener 146, the tensioning force will cause the outer periphery 53 of the bushing member 51 to expand outwardly, as indicated by arrows 53", at outer aperture 145, and more in particular, at the interface of outer aperture 145 through outer segment 142.

As such, bushing member 51 cannot be pulled in through outer aperture 145 in the direction of the tensioning force, as demonstrated in FIG. 9B. As will be appreciated, the application of a greater tensioning force will simply result in further outward expansion of the outer periphery 53 of the bushing member 51 in the direction of arrows 53", once again, preventing further passage of the bushing member 51 through outer aperture 145. As before, a similar result will be observed upon application of a tensioning force (TF) on a bushing member 51 secured through an inner aperture 135 via bushing fastener 136.

While the concept of bushing fasteners 136, 146 to secure opposite ends of a bushing member 51 through corresponding inner and outer apertures 135, 145, is presented above in the context of a drive shaft damper assembly 100, it is noted that it is well within the scope and intent of the present invention to employ these components, namely, bushing member 51, apertures 135, 145, and corresponding fasteners 136, 146, to secure other parts to one another, in the manner described in detail hereinabove. More specifically, the combination of bushing member 51, inner and/or outer aperture 135, 145, and fasteners 135, 146, comprise a universal interconnection system which may be utilized to secure any of a number of components to one another and/or to one or more additional components.

Turning next to FIGS. 5A through 5F, these figures are illustrative of various embodiments of bushing member 51 in accordance with the present invention. FIG. 5A illustrates bushing member 51 having a homogenous construction 54, i.e., a single material of construction. It is within the scope and intent of the present invention for bushing members 51 to be manufactured from any of a plurality of materials including natural rubber, synthetic rubber, as well as a variety of other synthetic elastomeric materials. Further, it is anticipated that bushing members 51 in accordance with the present invention may comprise a wide range of elastomeric properties. For example, bushing member 51 illustrated in FIG. 5B comprises a composite construction 55 having an inner layer 56 and an outer layer 56'. In at least one embodiment, composite construction 55 includes a cloth, fabric or other similar material comprising an intermediate layer 56", such as is illustrated in FIG. 5C, to impart additional strength, and to limit the elastic characteristics of a bushing member 51 comprising such a composite construction 55.

In at least one further embodiment, such as illustrated in FIG. 5D, a bushing member 51 may comprise an auxiliary bushing member 57 disposed within at least a portion of bushing member 51. Further, auxiliary bushing member 57 may be integrally formed with bushing member 51 and comprise a homogenous construction 54 with the same. Alternatively, auxiliary bushing member 57 may comprise the same material of construction as bushing member 51, however, it may comprise a separate, removable component therefrom. In yet one further embodiment, auxiliary bushing member 57 may comprise a different material of construction from bushing member 51, and may be either removably or fixedly disposed therein. FIGS. 5E and 5F illustrate the disposition of auxiliary bushing member 57 relative to bushing member 51. Specifically, FIG. 5E is a cross-sectional view of bushing member 51 of FIG. 5D along lines E-E thereof, clearly showing auxiliary bushing member 57 disposed therein so as to provide sufficient clearance for attachment of inner bushing mount 35 and outer bushing mount 45 at opposite ends of bushing member 51. FIG. 5F is a cross-sectional view of bushing member 51 of FIG. 5D along lines F-F thereof, further illustrating the disposition of auxiliary bushing member 57 relative to bushing member 51, in at least one embodiment.

Figure 6A:
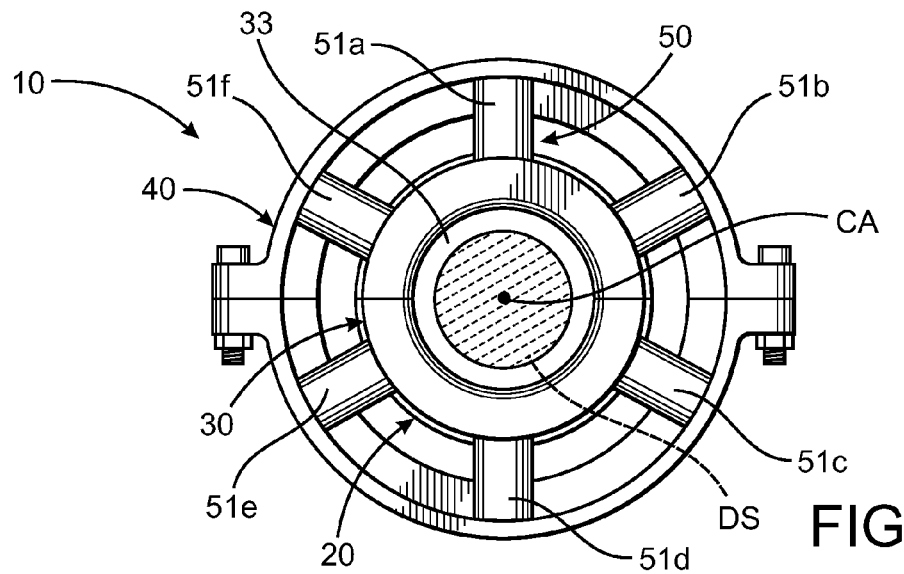
FIG. 6A is a cross-sectional view of the drive shaft damper assembly of FIG. 3 installed on a drive shaft bearing on a drive shaft, without perceivable force exerted thereon.
Figure 6B:
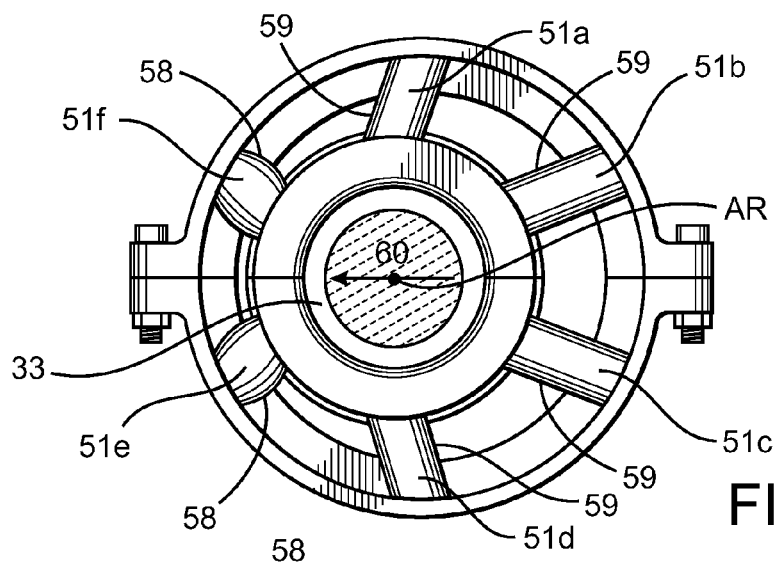
FIG. 6B is a cross-sectional view of the drive shaft damper assembly of FIG. 6A, wherein the drive shaft is exerting a compression force on the damper assembly at approximate 270 degrees.
Figure 6C:
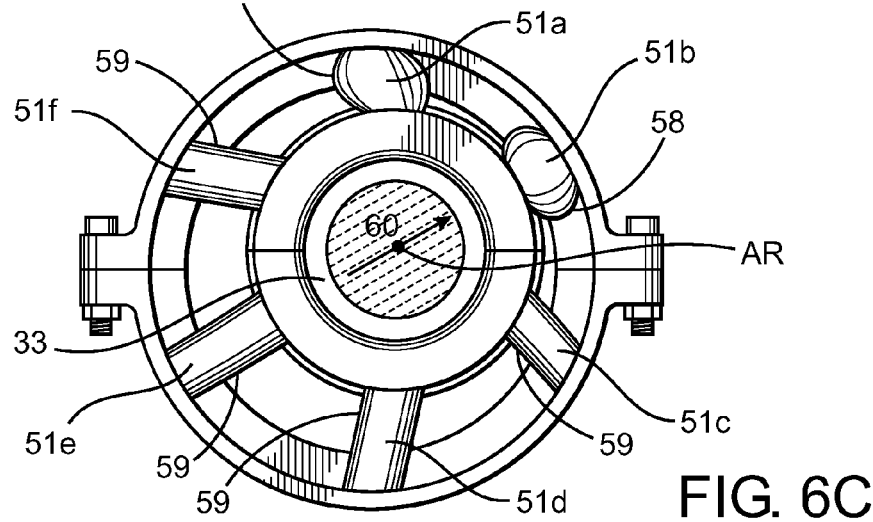
FIG. 6C is a cross-sectional view of the drive shaft damper assembly of FIG. 6A, wherein the drive shaft is exerting a compression force on the damper assembly at approximate 60 degrees.

Having described the various structural components and embodiments of the drive shaft damper assembly 10 in accordance with the present invention, FIG. 6A through 6C are illustrative of the drive shaft damper assembly 10 mounted in an operable engagement with a drive shaft (DS). In particular, FIG. 6A is illustrative of the drive shaft damper assembly 10 mounted to drive shaft, wherein the drive shaft is exerting no perceptible, i.e., no visibly detectable, force on bushing assembly 50. FIG. 6A is representative of the drive shaft damper assembly 10 of the present invention mounted to drive shaft which is either at rest, or is rotating substantially symmetrically about its central axis (CA). As may be seen from the FIG. 6A, in at least one embodiment, bushing members 51 are arranged in a substantially symmetrical arrangement relative to the drive shaft (DS) and have similar lengths relative to one another, which is indicative of a lack of any perceptible compression or tension forces being exerted thereon.

Looking next to FIG. 6B, the axis of rotation (AR) of the drive shaft has shifted to the left from the position of the central axis (CA) as shown in FIG. 6A. The shift in the axis of rotation (AR) of the drive shaft (DS) can result for a number of reasons, such as, minor misalignment of the portions of the drive shaft (DS) with one another, imperfections in the cylindrical configuration, i.e., bends, in either drive shaft portion, or other inherent imperfections, as well as from resonant frequencies which may set up as a result of certain operating conditions of the vehicle itself, such as speed and/or road surface conditions. FIG. 6B further illustrates that the offset in the axis of rotation (AR) of drive shaft (DS) results in the drive shaft exerting a force on bushing assembly 50 at approximately 270 degrees, or about 9:00, as represented by load vector 60. FIG. 6B also clearly illustrates that the individual bushing members 51e and 51f are in a state of compression as a result of the force exerted by the drive shaft (DS), while bushing members 51a through 51d are each in a state of tension, once again, as a result of the location of the force exerted by the drive shaft (DS) relative to bushing assembly 50. As is also evident from FIG. 6B, as a result of the opposing tension forces on bushing members 51a through 51d, bushing member 51e and 51f will tend to urge drive shaft (DS) back towards the symmetrical orientation as illustrated in FIG. 6A, thereby affecting rotation of the drive shaft (DS) about its central axis (CA).

As will be appreciated, the complementary compression and tension forces illustrated in FIG. 6B will not exist in the situation where a split annular bushing is installed around the drive shaft bearing. Specifically, each of bushing members 51a through 51f of the bushing assembly 50 in accordance with the present invention are secured to both inner damper assembly 30 and outer damper assembly 40 as clearly illustrated in FIGS. 6A through 6C. Conversely, a split annular bushing which is disposed around the drive shaft bearing is merely held in position by an overlying clamp or other such retainer, but it is not secured to either the drive shaft bearing or the clamp, and as such, it can not produce the complementary tension and compression forces. In particular, when a drive shaft exerts a load on one portion of a split annular bushing, that portion of the split annular bushing compresses in the direction of the load, however, because the bushing is split into portions which are not operatively secured to inner and outer dampers, no complementary tension force is generated in the other portion of the split annular bushing. Rather, a gap or space may form between the drive shaft and the other portion of the split annular bushing opposite the load exerted by the drive shaft. As such, complementary compression and tension forces are not available to force the drive shaft back into rotation along its central axis.

FIG. 6C is illustrative of drive shaft exerting a force on a different portion of bushing assembly 50 in accordance with the present invention. As illustrated in FIG. 6C, the drive shaft (DS) is exerting a force at approximately 60 degrees, or about 2:00, such that bushing members 51a, 51b, and 51c are under varying states of compression. Additionally, as a result of the force exerted by the drive shaft (DS) in the direction of load vector 60 in FIG. 6C, bushing members 51d through 51f are in varied states of tension. Once again, and similar to the situation described above with respect to FIG. 6B, the complementary compression and tension forces exhibited by bushing members 51a through 51f will tend to urge drive shaft (DS) back into rotation along its central axis (CA). As will be appreciated, a force exerted by the drive shaft (DS) at approximately 60 degrees, or 2:00, on a split annular bushing, would again result in a compression force on a portion of the split annular bushing adjacent the drive shaft at the point of said force, however, the drive shaft would simply pull away from and leave a gap between itself and the oppositely disposed other portion of the split annular bushing. Once again, the bushing assembly 50 in accordance with the present invention provides complementary forces to tend the drive shaft (DS) back into rotation about its central axis (CA).

As will be further appreciated from FIGS. 6A through 6C, bushing assembly 50 may be "tuned" to account for minor imperfections which may cause the drive shaft (DS) to rotate offset from its central axis (CA). Specifically, individual bushing members 51a through 51f may be selected so as to exert greater or lesser tension or compression forces, as may be required to urge the drive shaft (DS) back into rotation along its central axis (CA). Because the bushing members, such as, bushing members 51a through 51f, of the present invention are easily and individually removed and replaced from the bushing assembly 50 while the drive shaft remains mounted to the vehicle, this "tuning" process may be accomplished by simply trial and error by replacing one or more bushing members until the drive shaft (DS) is urged back into rotation substantially along its central axis (CA).

As one example, in the event a drive shaft (DS) has a tendency to rotate off center to the left, such as is shown in FIG. 6B, bushing members 51e and 51f may be constructed from a material having a harder durometer, while those of bushing members 51a through 51d comprise a material of construction having a softer durometer. A number of different durometer scales exist to measure relative hardness or resistance to permanent deformation of a various different materials. In one embodiment of the present invention, the bushing members 51 comprise a material of construction having a durometer in a range of about 50 to about 80 on the Type A durometer scale, the higher the durometer, the harder the material of construction, and vise versa. In at least one embodiment, one or more bushing members 51 comprise a durometer in a range of about 65 to 70 on a Type A durometer scale.

Additionally and/or alternatively, bushing members 51e and 51f may comprise a greater outer periphery 53 thereby providing more material with which to resist the compressive force exerted by the drive shaft (DS), and/or bushing members 51e and 51f may comprise a composite construction 55, once again selected so as to offset the compressive force exerted by the drive shaft (DS) in the direction of load vector 60. Selectively positioning bushing members, once again, by way of example, bushing members 51a through 51f, to more evenly distribute the load or force exerted by the drive shaft (DS) during operation, the present bushing assembly 50 is utilized to prevent resonant frequencies from setting up while the drive shaft (DS) rotates, thereby preventing the discomfort experienced by a driver and/or passenger of the vehicle, as well as to prevent damage to the vehicle which can result from operation while such frequencies have been established.

In addition, bushing members 51 may be selectively positioned to simply compensate for the weight of the drive shaft (DS) supported by the bushing assembly 50. As before, and by way of example, bushing members 51c, 51d, and 51e of FIG. 6A may comprise a material of construction having a harder durometer than bushing members 51f, 51a, and 51b, in order to account for the weight of the drive shaft (DS) itself. In one further embodiment, and once again with reference to the illustrative embodiment of FIG. 6A, each of bushing members 51a though 51f may have varying durometer ratings to provide a varying degree of support to the drive shaft (DS) along and about its circumference, once again, with bushing member 51d comprising the hardest durometer material and bushing member 51a having the softest durometer material.

Furthermore, in addition to varying the durometer of the material of construction of one or more bushing member 51, the length and/or width of a bushing member 51 may be varied in order to facilitate "tuning" the bushing assembly 50. Further, combinations of homogenous, composite, and/or auxiliary bushing members 51 may be utilized to further facilitate "tuning" a particular bushing assembly 50.

It is further noted that the foregoing operative features, such as "tuning" a bushing assembly 50 based on the operational characteristics of a particular drive shaft (DS), are equally applicable to the embodiment of a drive shaft damper assembly 100 as described herein and illustrated in FIGS. 7 and 8.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,
What is claimed is:

1. A drive shaft damper assembly operable with a drive shaft bearing which is secured to a drive shaft of a vehicle, said assembly comprising:
   a bearing collar assembly having a collar and a securing mechanism structured to securely attach said collar to the drive shaft bearing,
   said bearing collar assembly comprising a plurality of collar members structured to permit said collar to be positioned around and securely attached to the drive shaft bearing while the drive shaft remains mounted to the vehicle,
   an inner damper assembly interconnected to said bearing collar assembly, said inner damper assembly at least partially defining an inner bushing interface, wherein said inner bushing interface comprises a plurality of spaced apart inner apertures,
   an outer damper assembly structured to substantially encircle said inner damper assembly, said outer damper assembly at least partially defining an outer bushing interface, wherein said outer bushing interface comprises a plurality of spaced apart outer apertures,
   a bushing assembly comprising a plurality of bushing members individually and axially interconnected in an operative engagement between said inner damper assembly and said outer damper assembly, wherein at least a portion of each of said plurality of bushing members is dimensioned and at least partially disposed through one of said plurality of inner apertures or one of said plurality of outer apertures, and
   a mounting mechanism structured to securely attach said outer damper assembly to a portion of the vehicle.

2. The assembly as recited in claim 1 wherein said inner damper assembly comprises a plurality of inner sections, each of said plurality of inner sections being interconnected to a corresponding one of said plurality of collar members of said bearing collar assembly.

3. The assembly as recited in claim 2 wherein each of said plurality of inner sections of said inner damper assembly is integrally attached to said corresponding one of said plurality of collar members of said bearing collar assembly.

4. The assembly as recited in claim 2 wherein said collar is positioned around and securely attached to the drive shaft bearing while the drive shaft remains mounted to the vehicle and said plurality of inner sections of said inner damper assembly define a drive shaft aperture structured to permit at least a portion of the drive shaft to pass therethrough when said plurality of inner sections are disposed in an operative orientation with one another.

5. The assembly as recited in claim 1 wherein said portion of each of said plurality of bushing members is dimensioned to be at least partially disposed through any of said plurality of inner apertures or said plurality of outer apertures.

6. The assembly as recited in claim 5 further comprising a plurality of bushing fasteners, wherein one of said plurality of bushing fasteners operatively engages said portion of one of said plurality of bushing members disposed through one of said plurality of inner apertures.

7. The assembly as recited in claim 5 further comprising a plurality of bushing fasteners, wherein one of said plurality of bushing fasteners operatively engages said portion of one of said plurality of bushing members disposed through one of said plurality of outer apertures.

8. The assembly as recited in claim 6 wherein a different one of said plurality of bushing fasteners operatively engages a different portion of said one of said plurality of bushing members disposed through one of said plurality of outer apertures.

9. The assembly as recited in claim 6 wherein one of said plurality of bushing fasteners removably secures said one of said plurality of bushing members to said inner bushing assembly.

10. The assembly as recited in claim 7 wherein one of said plurality of bushing fasteners removably secures said one of said plurality of bushing members to said outer bushing assembly.

11. The assembly as recited in claim 9 wherein a different one of said plurality of bushing fasteners removably secures a different portion of said one of said plurality of bushing members to said outer bushing assembly.

12. A drive shaft damper assembly operable with a drive shaft bearing which is secured to a drive shaft of a vehicle, said assembly comprising:
   a bearing collar assembly having a collar and a securing mechanism structured to securely attach said collar to the drive shaft bearing,
   said bearing collar assembly comprising a plurality of collar members structured to permit said collar to be positioned around and securely attached to the drive shaft bearing while the drive shaft remains mounted to the vehicle, an inner damper assembly interconnected to said bearing collar assembly, said inner damper assembly at least partially defining an inner bushing interface, wherein said inner bushing interface comprises a plurality of spaced apart inner apertures, an outer damper assembly structured to substantially encircle said inner damper assembly, said outer damper assembly at least partially defining an outer bushing interface, wherein said outer bushing interface comprises a plurality of spaced apart outer apertures, each of said plurality of spaced apart outer apertures corresponding to a different one of said plurality of spaced apart inner apertures, a bushing assembly comprising a plurality of bushing members individually and axially interconnected in an operative engagement between said inner damper assembly and said outer damper assembly, wherein each of said plurality of bushing members comprises oppositely disposed ends dimensioned and at least partially disposed through one of said plurality of inner apertures or one of said plurality of outer apertures, and a mounting mechanism structured to securely attach said outer damper assembly to a portion of the vehicle.

13. The assembly as recited in claim 12 wherein a different one of each of said oppositely disposed ends of at least one of said plurality of bushing members is disposed through a different corresponding one of said plurality of inner apertures and said plurality of outer apertures.

14. The assembly as recited in claim 12 further comprising a plurality of bushing fasteners, a different one of each of said plurality of bushing fasteners operatively engaging a different one of said oppositely disposed ends of said plurality of bushing members disposed through different corresponding one of said plurality of inner apertures and said plurality of outer apertures.

15. The assembly as recited in claim 14 wherein corresponding ones of said plurality of bushing fasteners removably secure said plurality of bushing members in a damper zone disposed substantially between said inner damper assembly and said outer damper assembly.

16. The assembly as recited in claim 12 wherein at least some of said plurality of bushing members comprise a material of construction having a harder durometer relative to others of said plurality of bushing members.

17. The assembly as recited in claim 16 wherein at least some of said plurality of bushing members comprise a material of construction having a softer durometer relative to others of said plurality of bushing members.

18. The assembly as recited in claim 17 wherein at least some of said plurality of bushing members are selectively positioned between said inner damper assembly and said outer damper assembly based upon said durometer of said material of construction thereof.

19. The assembly as recited in claim 18 wherein said plurality of bushing members are selectively positioned to facilitate tuning the drive shaft, wherein tuning the drive shaft is at least partially defined by said plurality of bushing members cooperatively acting to maintain the drive shaft in rotation substantially about its central axis.

* * * * *